United States Patent [19]

Umezawa et al.

[11] 3,903,285

[45] Sept. 2, 1975

[54] METHOD FOR TREATING PARKINSONISM
[75] Inventors: Hamao Umezawa, Tokyo; Toshiharu Nagatsu, Nagoya, both of Japan
[73] Assignee: Zaidan Hojin Biseibutsu Kagaku Kenkyu Kai, Kami-Osaki, Japan
[22] Filed: Aug. 5, 1974
[21] Appl. No.: 495,109

Related U.S. Application Data
[63] Continuation-in-part of Ser. No. 319,634, Dec. 29, 1972, abandoned, which is a continuation-in-part of Ser. No. 76,323, Sept. 28, 1970, abandoned.

[52] U.S. Cl. .............................................. 424/266
[51] Int. Cl.² ....................................... A61K 31/455
[58] Field of Search .................................... 424/266

*Primary Examiner*—Stanley J. Friedman
*Attorney, Agent, or Firm*—Brady, O'Boyle & Gates

[57] ABSTRACT

A method for treating parkinsonism comprising administering to a human suffering from parkinsonism clacium 5-butylpicolinate or calcium 5-pentylpicolinate.

3 Claims, 1 Drawing Figure

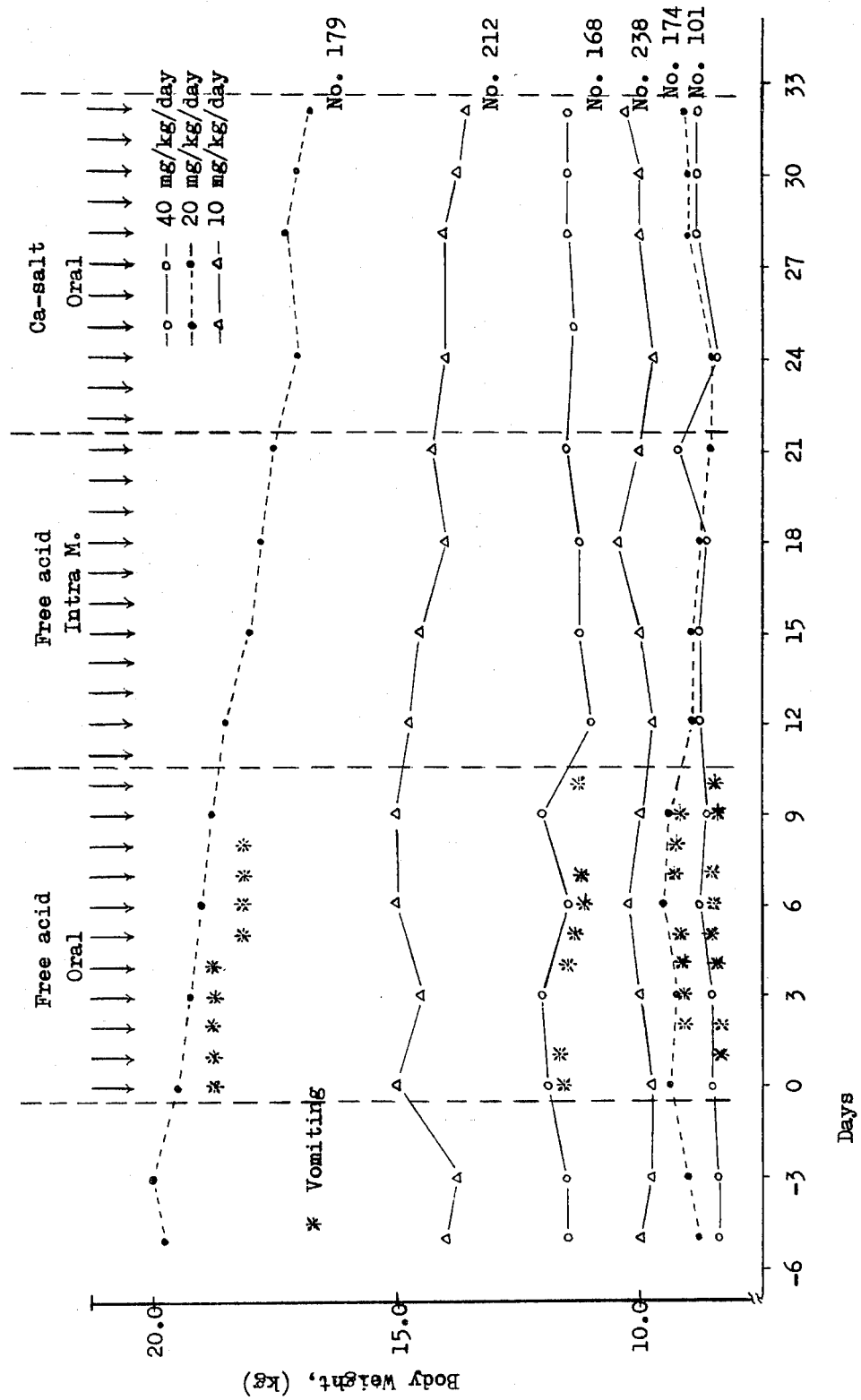

METHOD FOR TREATING PARKINSONISM

This is a continuation-in-part of our copending application Ser. No. 319,634, filed Dec. 29, 1972, now abandoned, which was a continuation-in-part of application Ser. No. 76,323, filed Sept. 28, 1970, now abandoned.

This invention relates to a method for treating parkinsonism. More particularly, the invention relates to the use of 5-butyl and 5-pentylpicolinic acids and their salts which have the effect of inhibiting dopamine β-hydroxylase and formulations thereof as therapeutically useful compositions.

The active compounds inhibiting β-hydroxylation of dopamine in accordance with the present invention can be identified as 5-alkylpicolinic acid of the formula:

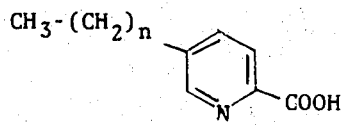

wherein $n$ is 3 or 4. Depending on the acidic and the basic groups these active compounds form their salts and the active compounds in the present invention also include the salts of the said compounds.

The compounds of this invention are active when administered orally, rectally or parenterally. In order to ensure proper absorption and favorable therapeutic effect, they are preferably incorporated in suitable convention excipienses such as refined sugar, lactose, starch, calcium carbonate, coconut oil etc. These compounds, when injected subcutaneously or intramuscularly, cause irritation in the injected area and the oral or the rectal use of these compounds are preferred than the subcutaneous or the intramuscular injection. Moreover, these compounds are effective when orally or rectally administered. In clincial use of these compounds the recommendable dosage is from about 150 to 300 mg per day. Thus, in preparing tablets, capsules, elixirs, suppositories or other dosage forms with suitable excipienses the formulation should preferably contain 20 – 100mg of active drug per dosage unit.

In the systematic screening studies of fungal compounds inhibiting dopamine β-hydroxylase, it was discovered by the present inventors that 5-butylpicolinic acid has the strong activity of inhibiting this enzyme reaction. This compound has been known as an antibiotic called fusaric acid. Dopamine β-hydroxylase is one of enzymes working for biosynthesis of norepinephrine, and 5-butylpicolinic acid was found by the present inventors to markedly reduce the epinephrine content in various tissues such as heart muscle, and adrenal glands. Though the decrease of epinephrine in brain is slight, this compound shows also weak sedative effect.

Inhibition of β-hydroxylation of dopamine can cause accumulation of dopamine which can reduce the symptoms of parkinsonism such as trembling, rigidity, etc. It was also discovered by the present inventors that this compound has the strong hypotensive action. At present, L-DOPA (3-(3,4-dihydroxy phenyl)-L-alanine) is used for treatment of parkinsonism. This compound, after taken by brain cells, is converted to dopamine which exhibits the therapeutic effect. However, some part of dopamine thus formed is oxidized by dopamine β-hydroxylase and norepinephrine thus formed raises the blood pressure. Fusaric acid (5-butylpicolinic acid) which inhibits dopamine β-hydroxylase can suppress the hypertensive effect of L-DOPA and also it can reduce the dose of L-DOPA used for treatment of parkinsonism. Really, two cases of parkinsonism have been successfully treated without any toxic signs by fusaric acid (3 times of 50mg tablet orally per day and 250mg tablet of L-DOPA 3 times a day or two 250mg tablets of L-DOPA 3 times a day.) The increase of blood pressure which occurred during administration of L-DOPA alone was not observed in the cases when fusaric was administered with L-DOPA at the same time. Moreover, the effective Dose of L-DOPA could be reduced to 0.75g or 1.25g a day). It was also observed that fusaric acid alone improved symptoms of parkinsonism such as trembling and rigidity. On the basis of these discoveries, a new therapeutic method for treating parkinsonism comprising the use of 5-butylpicolinic acid or its salt as the therapeutic agent against parkinsonism was introduced. $LD_{50}$ of this compound to mice was 100mg/kg by the intravenous injection and 80mg/kg by the intraperitoneal injection. The daily intramuscular injection or the oral administration of 40mg/kg, 20mg/kg or 10mg/kg caused no toxic sign in dogs except vomiting in some dogs by oral administration. The death caused by the lethal dose was shown by the detailed exmaination of toxicities of this compound to be due to its effect reducing blood pressure, but not due to other kinds of biological activities. Calcium salt of this compound showed the same effect. $LD_{50}$ of the calcium salt was 125mg/kg both by the intraperitoneal and by the intramuscular injection. The oral administration of calcium salt gives the same effect and the dogs can have calcium salt without vomiting.

Before the present invention, there has been no observation on the therapeutic effect on parkinsonism of 5-butylpicolinic acid and its homologues. The examination of the effects of 5-alkylpicolinic acids were first made by the present inventors. Preparing these compounds by the chemical synthesis, their effects on dopamine β-hydroxylase and on blood pressure were examined. Dopamine β-hydroxylase was prepared from medulla of beef adrenals. The adrenals were homogenized in 0.02 M phosphate buffer of pH 6.5 containing sucrose at 8.5%. The ratio of the buffer to the adrenals was 10:1 in the weight. The hologenized solution was centrifuged at 700g for 10 minutes and the supernatant was centrifuged at 10,000g for 1 hour. The precipitate was collected and suspended in 0.02 M phosphate buffer at pH 6.5 containing sucrose at 8.5%. The weight of the buffer used was the same as that of the adrenals from which the enzyme was extracted. This enzyme solution could be kept more than several months in the frozen state without the decrease of the activity. Generally, the enzyme solution was 35 times diluted with 0.02 M phosphate buffer of pH 6.5 containing sucrose at 8.5% and 0.1ml of diluted solution was incorporated in the reaction mixture of the enzyme reaction. This concentration of the enzyme in the reaction mixture was enough to give the linear proceed of the reaction during 30 minutes of the enzyme reaction. The reaction mixture for the enzyme reaction consisted of 1 M potassium phosphate buffer of pH 6.5 0.2ml, 1/10 M ascorbic acid 0.1ml, 2/100 M fumaric acid in 0.2 N NaOH 0.05ml, 4mg/ml of catalase 0.05ml, 1/10 M tyramine 0.1ml, 1/10 M N-ethylmaleimide 0.1ml, the enzyme solution 0.1ml, the solution of the test material 0.1ml, and the total volume was made 1.0ml with distilled water. After the reaction under shaking at 37°C for 25 minutes, 0.2ml of 50% trichloroacetic acid solution was added to cease the reaction and it was passed through a column (5cm length and 0.6cm diameter) of a sulfonic acid resin (Amberlite IR-CG-120) in H form. Ten ml of distilled water was passed through the column and then the reaction product (octopamine) which was adsorbed on the column was eluted with 3.0ml of 4 N NH$_4$OH. The reaction product in the eluate was oxidized to p-hydroxybenzaldehyde by addition of 0.3ml of 2.0% sodium peroxidate and after 6 minutes 0.3ml of 10% sodium metabisulfite was added. The optical density at 330m$\mu$ was determined. The homologues examined can be shown by the formula:

$$C_nH_{2n+1}\text{-pyridine-COOH}$$

wherein $C_nH_{2n+1}$ means the straight hydrocarbon chain. The concentrations of the homologues for 50% inhibition of dopamine $\beta$-hydroxylase were as follows:

$n = 0$ $3.5 \times 10^{-6}$M; $n = 1$ $5.0 \times 10^{-6}$M; $n = 2$ $2.2 \times 10^{-6}$M;

$n = 3$ $3.0 \times 10^{-7}$M; $n = 4$ $7.5 \times 10^{-8}$M; $n = 5$ $5.0 \times 10^{-8}$M;

$n = 6$ $1.3 \times 10^{-7}$M; $n = 7$ $2.3 \times 10^{-7}$M; $n = 8$ $6.8 \times 10^{-7}$M;

$n = 9$ $2.3 \times 10^{-6}$M.

The toxicities of these compounds in terms of intraperitoneal LD$_{50}$ values (mg/kg body weight) in mice were as follows:

$n = 0$ 360; $n = 1$ 175; $n = 2$ 125; $n = 3$ 120; $n = 4$ 80; $n = 5$ 70; $n = 6$ 85; $n = 7$ 45; $n = 8$ 62; $n = 9$ 75.

As described above among 5-alkylpicolinic acid, the effect of inhibiting dopamine $\beta$-hydroxylase was found by the present inventors to be the strongest in 5-butyl and 5-bentylpicolinic acids. 5-pentylpicolinic acid was examined in detail for the effect on norepinephrine and dopamine in brain, heart and adrenal and the toxicities and almost the same effect and the similar toxicities as 5-butylpicolinic acids were confirmed.

Therapeutic compositions comprising 5-butylpicolinic acid, 5-pentylpicolinic acid or of their salts are given by the present invention.

The following examples will show how the active compounds of the present invention can be prepared, as well as the preparation of typically orally and rectally administrable formulations of the active compounds, but it is to be understood that these examples are given by way of illustration and not of limitation.

EXAMPLE 1

A stirred mixture of 6 Og of 5-butyl-2-picoline, 50ml of pyridine, and 7.3g of selenium dioxide was refluxed for 3.5 hours, clarified, evaporated in vacuo, and the residue was taken in 20ml of water. After decolorization with active carbon, the solution was concentrated, extracted with ethyl acetate, and the extract chromatographed over 50g of silica gel with ethyl acetate to give 3.0g of 5-butylpicolinic acid (fusaric acid), melting at 99 – 100C after recrystallization from ehtyl acetate-hexane.

EXAMPLE 2

By a method similar to that described in Example 1, 5.0g of 5-pentyl-2-picoline was oxidized with 6.1g of selenium dioxide in pyridine and the product was recrystallized from isopropyl ether to give 3.3g of 5-pentylpicolinic acid, melting at 104 – 105%.

EXAMPLE 3

5-butylpicolinic acid (150mg) was dissolved in 3ml of water at 50°C and the hot solution was treated with 100mg of calcium chloride in 1ml of water and adjusted to pH 6.8 with 3% aqueous ammonia to deposit 160mg of the calcium salt as fine needless.

EXAMPLE 4

A solution of 150mg of 5-pentylpicolinic acid in 3ml of water and 0.5ml of methanol was treated with 10% aqueous chloride and brought to pH 6.8 with dilute ammonia water to deposit 170mg of calcium salt.

EXAMPLE 5 - Tablets

A granulation is prepared of

| | |
|---|---|
| lactose | parts - 68 |
| starch | do. - 32 |
| water | A sufficient quantity |

The granulation is dried and screened.

| | G. |
|---|---|
| 5-butylpicolinic acid | 50 |
| lactose granulation | 197.5 |
| magnesium stearate | 2.5 | are mixed well together and compressed into tablets weighing 250mg and containing 50mg of the acid.

EXAMPLE 6 - Capsules

A mixture is prepared, containing equal parts by weight of 5-pentylpicolinic acid and lactose. The mixture is then filled, 100mg per capsule, into standard clear gelatin capsules and after closing, the capsules are preferably dusted with talc or corn starch. The resulting capsules contain 50mg of acid per dosage unit.

EXAMPLE 7 - Suppositories

A solution is made by heating to about 40°C of

| | G |
|---|---|
| calcium 5-butylpicolinate | 5 |
| polyethylene glycol (average mol. wt. 600) | 17 |
| polyethylene glycol (average mol. wt. 1000) | 33 | and the solution is mixed with

| | G |
|---|---|
| sorbitan monooleate | 2.7 |
| polyoxyethylene sorbitan monooleate | 2.7 |
| hydrogenated coconut oil (melted) | 233.0 |
| water | 1.6 |

The mixture is poured into molds, giving suppositories weighing 3g and containing 50mg of the calcium salt.

EXAMPLE 8 - Elixir

Mixture 5mg/ml. A vehicle solution is prepared by heating of

| | G. |
|---|---|
| sodium carboxylmethylcellulose | 7 |
| sorbitol solution (N.F.) | 775 |
| methylparaben | 1 |
| water | 324 |

After cooling to room temperature

| | G. |
|---|---|
| raspberry flavor | 25 | is added and the vehicle is mixed with

| | G. |
|---|---|
| calcium 5-butylpicolinate | 5 |
| polyoxyethylene sorbitan monooleate | 0.5 | and the mixture is homogenized in a homogenizer yielding an elixir containing 5mg/ml of the calcium salt. A dosage unit of 15ml (1 tablespoon) thus contains 75mg of the calcium salt.

In the foregoing Examples 5 to 8, it will be understood that 5-butylpicolinic acid, 5-pentylpicolinic acid, or their calcium salts can be substituted one another as the active component, and that the amount of active component can be suitably varied within the range of 20 to 100mg per dosage unit.

As noted above, the only sign of toxicity associated with the compositions of the invention was the inducement of vomiting caused by the oral administration of the free acid to dogs. The following examples are illustrative of the advantages of the calcium salts over the free acids with respect to this characteristic.

Fusaric acid was orally administered daily for 11 days, and thereafter injected intramuscularly daily for 11, days, and after that its calcium salt given orally daily for 11 days. Two dogs were tested for each dose. As shown in FIG. 1, 40 mg/g and 20 mg/kg of fusaric acid daily orally caused vomiting in all dogs. The doses, 10 mg/kg/day or 5 mg/kg/day did not cause vomiting. The calcium salt did not cause vomiting in any dosage tested: 40 mg/kg/day, 20 mg/kg/day, 10 mg/kg/day.

Subchronic toxicities of fusaric acid and its calcium salt:

Fusaric acid of the following doses, 40 mg/kg/day, 20 mg/kg/day, 10 mg/kg/day, were orally given daily to dogs for 30 days. Each dose group contained 4 dogs. The calcium salt was given daily for 30 days in the following dose: 100 mg/kg, 50 mg/kg, in only mg/kg. Each dose group contained 4 to 6 dogs. During 30 days the body weight, temperature and blood pressure were examined, and general tests were made on urine and blood. As summarized in Table 1, 40 mg/kg or 20 mg/kg of fusaric acid caused vomiting very often, and by autopsy, hemorrhagic erosion and small ulcers were observed in stomach, duodenum and small intestine. The lower dose such as 10 mg/kg/day did not cause the erosion. The calcium salt did not cause vomiting in any dosage. Hemorrhagic erosion was observed only one dog among 6 which received 100 mg/kg/day of calcium salt. The calcium salt in the dose of 50 mg/kg/day and 20 mg/kg/day caused none of the side effects in stomach and intestine. No abnormal change was observed in hematology and pathohistology in all organs of all dogs to which fusaric acid or its calcium salt were given daily.

The effect on vascular permeability:

Fusaric acid solution or its calcium salt solution was injected intracutaneously, and then Evans blue solution was intravenously injected, and diameters of blue zones were determined. As shown in Table 2, 10 mg/ml or 5 mg/ml solution of fusaric acid caused marked increase of the vascular permeability. However, the effect on the calcium salt was very weak. On the basis of comparative strengths, 10 mg/ml of the calcium salt was weaker than 2.5 mg/ml of fusaric acid.

These tests unequivocally establish that the calcium salts are far less toxic than the free acids of the compositions of the invention.

TABLE 1

SUBACUTE TOXICITY IN DOGS FOLLOWING ORAL ADMINISTRATION OF FUSARIC ACID AND CA-SALT

| Drugs Fusaric Acid | Dose mg/kg | No. of Dogs | Sex | Duration days | Vomiting | Toxicity group mean Body wt., kg | | Erosion *1) & Ulcer |
|---|---|---|---|---|---|---|---|---|
| | | | | | | Initial | after 30 days | |
| Face acid Oral | 40 | 4 | male | 10-30 | +++ | 10.5 | 10.8 | 4/4 +++ |
| | 20 | 4 | male | 10-30 | ++ | 14.2 | 13.5 | 3/4 ++ |
| | 10 | 4 | male | 30 | — | 12.5 | 12.7 | — |
| | 5 | 4 | male | 30 | — | 12.9 | 13.4 | — |
| | Control | 4 | male | 30 | — | 13.0 | 13.8 | — |
| Ca-salt Oral | 100 | 6 | male | 30 | — | 14.2 | 14.6 | 1/6 ++ |
| | 50 | 4 | male | 30 | — | 10.5 | 11.0 | — |
| | 20 | 4 | male | 30 | — | 9.8 | 11.2 | — |
| | Control | 4 | male | 30 | — | 13.2 | 13.8 | — |

*1) Erosion & Ulcer: in stomach, small intestin

TABLE 2

CAPILLARY PERMEABILITY

| | Dose mg/ml | ml | Evans blue values | |
|---|---|---|---|---|
| | | | ½hr. | 2 hr. |
| Free acid | 10 | 0.1 | 38 | 45 |
| | 5 | 0.1 | 38 | 40 |
| | 2.5 | 0.1 | 10 | 13 |
| | 1.25 | 0.1 | 4 | 4 |
| Ca-salt | 10 | 0.1 | 6 | 7.2 |
| | 5 | 0.1 | 3.2 | 3.6 |
| | 2.5 | 0.1 | 0.4 | 0.7 |
| Bradykinin | 0.1 mcg/ml | 0.1 | 6.2 | 6.5 |

What is claimed is:

1. A method for treating parkinsonism comprising administering to a human suffering from parkinsonism a member selected from the group consisting of calcium 5-butylpicolinate and calcium 5-pentylpicolinate in an amount between 150 and 300 mg per day.

2. The method of claim 1 wherein said member is calcium 5-butylpicolinate.

3. The method of claim 1 wherein said member is calcium 5-pentylpicolinate.

* * * * *